(12) United States Patent
Steeves

(10) Patent No.: US 6,294,953 B1
(45) Date of Patent: Sep. 25, 2001

(54) HIGH SENSITIVITY DEMODULATOR FOR A RADIO TAG AND METHOD

(75) Inventor: Wayne E. Steeves, Plano, TX (US)

(73) Assignee: Axcess, Inc., Carrollton, TX (US)

( * ) Notice: Subject to any disclaimer, the term of this patent is extended or adjusted under 35 U.S.C. 154(b) by 0 days.

(21) Appl. No.: 09/258,974

(22) Filed: Feb. 26, 1999

(51) Int. Cl.$^7$ ....................................... H04Q 9/00
(52) U.S. Cl. .................. 329/341; 340/10.1; 340/10.52; 340/10.34; 340/572.1; 342/42; 342/51; 329/341; 455/343
(58) Field of Search ................... 340/10.1, 10.52, 340/10.34, 572.1; 329/347, 342, 341; 342/42, 51; 455/343

(56) References Cited

U.S. PATENT DOCUMENTS

| | | | |
|---|---|---|---|
| 4,303,910 | 12/1981 | McCann | 340/572.2 |
| 4,471,345 | 9/1984 | Barrett, Jr. | 340/572.1 |
| 4,528,663 | 7/1985 | Citta | 370/229 |
| 4,691,202 | 9/1987 | Denne et al. | 340/10.2 |
| 4,862,160 | 8/1989 | Ekchian et al. | 340/10.32 |
| 4,955,038 | 9/1990 | Lee et al. | 375/256 |
| 5,153,878 | 10/1992 | Krebs | 370/337 |
| 5,175,729 | 12/1992 | Borras et al. | 370/345 |
| 5,220,557 | 6/1993 | Kelley | 370/345 |
| 5,227,803 | 7/1993 | O'Connor et al. | 342/442 |
| 5,266,925 | 11/1993 | Vercellotti et al. | 340/505 |
| 5,272,476 | 12/1993 | McArthur et al. | 340/870.13 |
| 5,305,008 | 4/1994 | Turner et al. | 342/44 |
| 5,351,052 | 9/1994 | D'Hont et al. | 342/42 |
| 5,425,032 | 6/1995 | Shloss et al. | 370/346 |
| 5,448,242 | 9/1995 | Sharpe et al. | 342/42 |
| 5,450,087 | 9/1995 | Hurta et al. | 342/42 |
| 5,453,747 | 9/1995 | D'Hont et al. | 342/42 |
| 5,471,212 | 11/1995 | Sharpe et al. | 342/51 |
| 5,488,376 | 1/1996 | Hurta et al. | 342/42 |
| 5,525,992 | 6/1996 | Froschermeier | 342/42 |
| 5,525,994 | 6/1996 | Hurta et al. | 342/51 |
| 5,539,394 | 7/1996 | Cato et al. | 340/10.32 |

(List continued on next page.)

FOREIGN PATENT DOCUMENTS

| | | |
|---|---|---|
| 0 161 779 A1 | 3/1985 | (EP) . |
| 0 245 555 A1 | 11/1987 | (EP) . |
| 0 467 036 A2 | 1/1992 | (EP) . |
| 0 565 046 A2 | 10/1993 | (EP) . |
| WO 91/17515 | 11/1991 | (WO) . |
| WO 93/04537 | 3/1993 | (WO) . |

OTHER PUBLICATIONS

"Radio Frequency Identification (RFID)—Standards, Common Applications, A Look Ahead, and Recommended Reading," http://www.aimglobal.org/techinfo/rfid/rfidintro.html, 4 pgs. Jun. 7, 1999.

AIM International, Inc., "Radio Frequency Identification RFID—A Glossary: AIM International WP–98/001R," http://www.aimglobal.org/techinfo/rfid/aimrfidglossary.html, Jun. 7, 1999.

AIM International, Inc., "Radio Frequency Identification RFID—A Basic Primer: AIM International WP–98/002R," http://www.aimglobal.org/techinfo/rfid/aimrfidbasics.html, Jun. 7, 1999.

"Radio Tag System and Method with Improved Tag Interference Avoidance", Patent Application No. 08/789,148, filed Jan. 24, 1997, Inventor: Wayne E. Steeves, (pending), Now U.S. Patent No. 6,034,603.

*Primary Examiner*—Arnold Kinkead
(74) *Attorney, Agent, or Firm*—Baker Botts L.L.P.

(57) ABSTRACT

A radio frequency tag accepts a received signal received by an antenna and demodulates that signal into a digital output using a comparator. The received signal is forwarded to a first comparator input. A threshold voltage generator generates a threshold voltage signal and forwards that signal to a second comparator input. The comparator compares the two inputs and generates a digital output based on the comparison.

27 Claims, 2 Drawing Sheets

U.S. PATENT DOCUMENTS

| | | | |
|---|---|---|---|
| 5,621,412 | 4/1997 | Sharpe et al. | 342/51 |
| 5,640,151 | 6/1997 | Reis et al. | 340/825.54 |
| 5,668,803 | 9/1997 | Tymes et al. | 370/312 |
| 5,686,902 | 11/1997 | Reis et al. | 340/10.2 |
| 5,721,733 | 2/1998 | Wang et al. | 370/332 |
| 5,737,330 | 4/1998 | Fulthorp et al. | 370/346 |
| 5,745,037 | 4/1998 | Guthrie et al. | 340/573.4 |
| 6,034,603 * | 3/2000 | Steeves | 340/572.1 |

* cited by examiner

HIGH SENSITIVITY DEMODULATOR FOR A RADIO TAG AND METHOD

TECHNICAL FIELD OF THE INVENTION

This invention relates generally to radio frequency identification (RFID) systems and more particularly to a high sensitivity demodulator for a radio tag and method.

BACKGROUND OF THE INVENTION

The management and tracking of personnel, assets, and other objects is required in a wide variety of environments and is often cumbersome, labor intensive, and expensive. Radio receivers and transmitters have been used for many years to identify personnel and objects in such environments. For example, many systems are known for attaching radio tags to items, such as automobiles, so that when automobiles equipped with radio tags enter a certain area, such as a toll booth area, the automobiles are automatically identified and the appropriate tolls are deducted from corresponding accounts, thereby obviating the need for drivers to stop and make payment at toll booths. Innumerable other applications for such radio tag systems have been identified, in areas ranging from inventory control to facility security to sporting event timing.

Radio frequency identification (RFID) systems generally use a fixed position base station capable of reading remote, portable tags attached to personnel, assets, or other objects. Tags generally operate on their wake-up frequency at low frequency, very low frequency, or microwave bands. Because of power consumption concerns and the life span of the portable, remote radio tags operating at low frequency or very low frequency, exclusive OR ("XOR") gates are almost exclusively used to demodulate incoming radio frequency signals. The use of XOR gates leads to low sensitivity and limited operational range for the radio tags.

SUMMARY OF THE INVENTION

In accordance with the present invention, a high sensitivity demodulator for a radio tag and method is provided which substantially eliminates or reduces disadvantages and problems associated with conventional demodulators for radio tags.

According to one embodiment of the present invention, there is provided a radio frequency tag comprising a threshold voltage generator and a comparator for demodulating a received signal. The threshold voltage generator generates a threshold voltage signal and forwards that signal to a first comparator input. An antenna receives a signal and forwards that received signal to a second comparator input. The comparator generates a digital output signal based on the results of the comparison of the two inputs.

More particularly, in accordance with a particular embodiment of the present invention, the threshold voltage generator and comparator are powered by only leakage current from a local power supply. The threshold voltage generator is comprised of a first resistor and a second resistor connected in series between the local power supply and a ground. A threshold voltage generator output is connected to the junction between the first resistor and the second resistor to provide the threshold voltage signal to the comparator.

Technical advantages of the present invention include providing an improved radio tag. In particular, the radio tag utilizes a highly efficient comparator that can demodulate low powered analog carrier signals while drawing only minimal current. As a result of the ability to demodulate low powered signals, the radio tag has improved sensitivity and the operational range of the radio tag is significantly increased. In addition, power consumption is minimized to maintain long tag life.

Other technical advantages will be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers are present like parts, and in which.

DETAILED DESCRIPTION OF THE INVENTION

Figure 1:
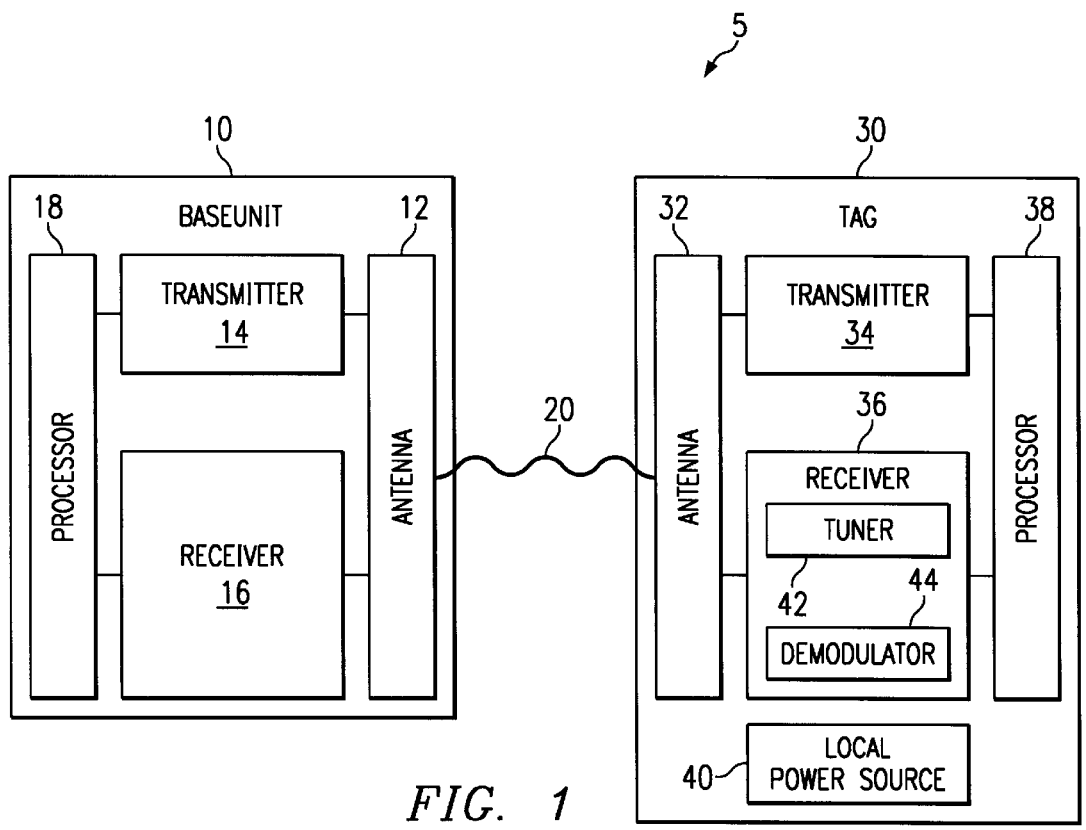
FIG. 1 is a block diagram illustrating an RFID system in accordance with one embodiment of the present invention.

FIG. 1 illustrates a radio frequency identification (RFID) system 5 in accordance with one embodiment of the present invention. In this embodiment, the base unit 10 resides in a fixed location and communicates with an active radio tag 30 on an analog signal at a specified radio frequency. The radio tag 30 is a remote, portable, self-contained device that may be affixed to a moveable item, such as a person, inventory, or vehicle.

Referring to FIG. 1, the base unit 10 is a conventional unit and includes a base unit antenna 12, a base unit transmitter 14, a base unit receiver 16, and a base unit processor 18. Base unit antenna 12 transmits and receives specific radio frequencies to allow communications between base unit 10 and radio tag 30. Base unit receiver 16 acquires incoming signals from base unit antenna 12 and demodulates the incoming signal. Base unit receiver 16 forwards the demodulated signal to base unit processor 18 to determine an appropriate action or response to the incoming signal.

Base unit transmitter 14 modulates signals generated by base unit processor 18 onto a carrier wave and transmits the modulated signal through base unit antenna 12 as the analog signal 20. The communicated signals may be initiated by base unit 10 in response to a signal received from the tag 30. As analog signal 20 travels away from base unit 10, the radio waves in analog signal 20 diminish in amplitude and, thus, in power. The remote, portable radio tag 30 has an operational range limited to the distance at which the transmitted radio waves fall below the minimum power level that radio tag 30 can detect.

For an RFID application, the frequency of the carrier wave is preferably a low frequency (LF) or very low frequency (VLF). In an exemplary embodiment, a low frequency of 132 KHz is used for communications between base unit 10 and one or more radio tags 30. In this embodiment, base unit 10 utilizes amplitude modulation to carry the communicated signal on the carrier wave. It will be understood that other suitable modulation schemes may be used.

Radio tag 30 is active and portable RFID or other suitable tag that can be affixed to and identify a moveable object such as a person, a vehicle, or a piece of inventory. Active radio tags are radio tags which contain a local, self-contained power supply for providing power to internal components. Radio tag 30 is portable in that it can be easily transported by attachment to a person or a moveable object and remains operational during transport.

Radio tag 30 includes an internal tag antenna 32, a tag transmitter 34, a tag receiver 36, a tag processor 38, and a local power supply 40. Tag antenna 32 allows radio tag 30 to transmit and receive radio frequency signals. The radio frequency on which radio tag 30 operates is synchronized with the radio frequency of base unit 10 such that radio tag 30 and base unit 10 may communicate. In one embodiment, radio tag 30 and base unit 10 may each transmit and receive at the same frequency. In the exemplary embodiment, for example, both communicate at a frequency of 132 KHz. Alternatively, radio tag 30 may receive signals on a first frequency and transmit signals on a second, discrete frequency in order to avoid collisions between the signals transmitted by different sources such as base unit 10 and radio tag 30.

The tag receiver 36 is coupled to tag antenna 32 to receive signals collected by tag antenna 32. Tag receiver 36 includes a tuner circuit 42 that is tuned to the transmitting frequency of base unit 10 and a demodulator 44.

Tuner circuit 42 eliminates extraneous signals which may cause false activations of radio tag 30 by filtering frequencies other than a target frequency. Tuner circuit 42 may include conventional tuner circuitry such as a high pass filter comprised of a capacitor in series with a resistor connected to a ground. Tuner circuit 42 effectively narrows the bandwidth of the signal received and forwarded by tag antenna 32. In an exemplary embodiment, tuner circuit 42 is set to 132 KHz but may be set to any suitable frequency.

After tuner circuit 42 obtains and filters the received signal, the tuned and filtered signal is forwarded to demodulator 44. Demodulator 44 demodulates the received signal and extracts the communicated signal in the form of a square wave, or digital bit stream, for processing by tag processor 38. As described in more detail below, demodulator 44 has a high sensitivity so that it can detect and demodulate low powered signals. In one embodiment, the demodulator has a sensitivity of less than 10 millivolts. As a result, the radio tag 30 can detect and process weak signals which significantly increases the operational range of radio tag 30 to 150 feet and beyond.

After demodulator 44 extracts the communicated signal from the carrier wave, the communicated signal is forwarded to tag processor 38 for processing. Tag processor 38 may be any suitable general purpose processor, micro-processor, or micro-controller. Tag processor 38 receives the communicated signal and determines if a response is necessary. If tag processor 38 determines that a response should be sent to base unit 10, a tag transmitter 34 modulates the response signal from tag processor 38 and transmits the modulated signal to base unit 10 via tag antenna 32.

Before tag processor 38 will process an incoming signal, a wake up signal signature must typically be received. This allows the tag processor 38 to remain in a low power, or sleep, state during periods of inactivity when the radio tag is outside the range of the base unit 10 or is otherwise not communicating. The wake up signal signature informs tag processor 38 that information requiring processing will arrive immediately following the wake up signal signature.

The wake up signal signature may also be used to eliminate false activations of radio tag 30. False activations may occur when utilizing a low threshold voltage level in demodulator 44. False activations of radio tag 30 are eliminated in part by tuner circuit 42 that only allows signals at a target frequency to pass into demodulator 44. By utilizing a wake up signal signature, the remainder of potential false activations may be effectively eliminated or reduced while still providing a high sensitivity demodulator.

Radio tag 30 is powered by a local power source 40. Local power source 40 may be a battery, solar cell system, or other suitable portable power source. In an exemplary embodiment, local power source 40 is preferably a three volt lithium coin cell battery. A characteristic of any battery or power source connected to electrical components is the leakage of a certain quantity of electrical current into the electrical circuit. To maintain radio tag 30 life, demodulator 44 is configured to operate on only leakage current of local power source 40. For the lithium coin cell battery, leakage current is generally less than four microamps. In this embodiment, the demodulator 44 may operate on about three microamps. By operating the demodulator 44 on leakage current only, radio tag 30 obtains a long shelf life of about 10 years before replacement of local power source 40 is necessary.

Figure 2:
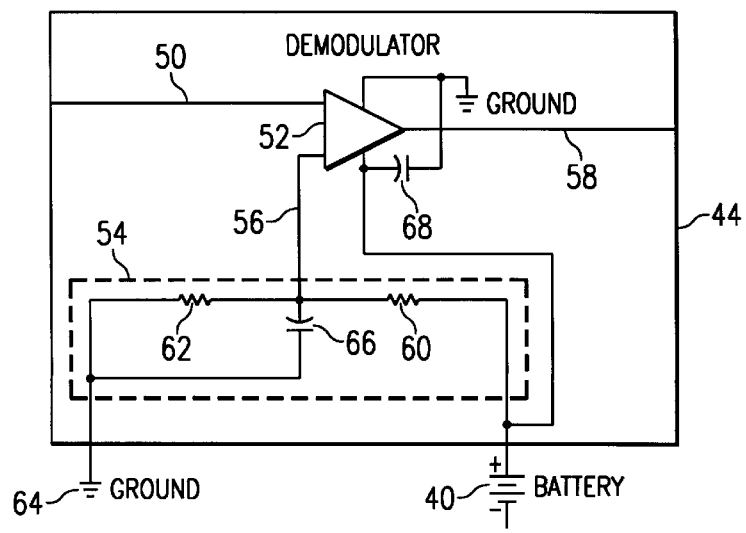
FIG. 2 is a block schematic diagram illustrating the high sensitivity demodulator for the radio tag of FIG. 1.

FIG. 2 illustrates details of demodulator 44 in accordance with one embodiment of the present invention. The demodulator 44 includes a comparator 52 and a threshold voltage generator 54. The threshold voltage generator 54 generates a threshold voltage signal that is used by the comparator 52 to demodulate an incoming signal and determine if a communicated signal is present. Comparator 52 should be in an active state at all times so that it is prepared to sample any signal that may be obtained by tag antenna 32. Since comparator 52 is always active, threshold voltage generator 54 is always active and both continuously draw current from battery 40. The comparator provides high sensitivity at low power consumption levels and this increases the range of the radio tag 30 without limiting its effective life.

Comparator 52 has a first input 50, a second input 56, and an output 58. The first input 50 is coupled to the tuner circuit 42 after the analog signal 20 has been tuned and filtered to receive the tuned signal. The second input 56 is coupled to the threshold voltage generator 54 to receive the threshold voltage signal. The output 58 is coupled to tag processor 38.

The comparator 52 is connected to local power source 40 and preferably operates on leakage current of the local power source 40. In one embodiment, the link between local power source 40 and comparator 52 has a capacitor 68 for regulation of the electrical current supplied to comparator 52. This prevents fluctuations in local power source 40 current from adversely affecting operation of the comparator 52.

In operation, comparator 52 demodulates the tuned signal by comparing it to the threshold voltage signal generated by threshold voltage generator 54. The digital output on output 58 is based on the results of the comparison. If the tuned signal exceeds the threshold voltage signal, comparator 52 generates a high output on digital signal 58. If tuned signal 50 is less than threshold voltage signal 56, comparator 52 generates a low output on digital signal 58. A high output corresponds to an "on" bit, and a low output corresponds to an "off" bit. Tag processor 38 receives the digital signal on output 58 and determines an appropriate response to be transmitted to base unit 10.

The propagation delay of comparator 52 determines the sampling rate of the incoming signal. The propagation delay of comparator 52 is dependent on the specific frequency which must be captured, demodulated, and processed. Generally, a propagation delay of seven to ten times less than the period of the carrier wave being processed is sufficient to fully capture the communicated signal. Thus, seven to ten samples would be taken of the incoming signal during each period. In the exemplary embodiment where the carrier wave has a frequency of 132 KHz, the comparator 52 has a period of 7.6 microseconds and a propagation delay of 900 nanoseconds which yields approximately eight samples per cycle of the carrier wave. The tag processor 38 accumulates and interprets the samples.

Conventional comparators satisfy the low power requirements but are impractical for application to an RFID tag as the propagation delay at low overdrive signals (i.e. 10 mv) is in excess of 12 microseconds. As described below, the comparator 52 of the present invention may be implemented by novelly modifying a commercially available system or fabricating the novel comparator.

Figure 3:
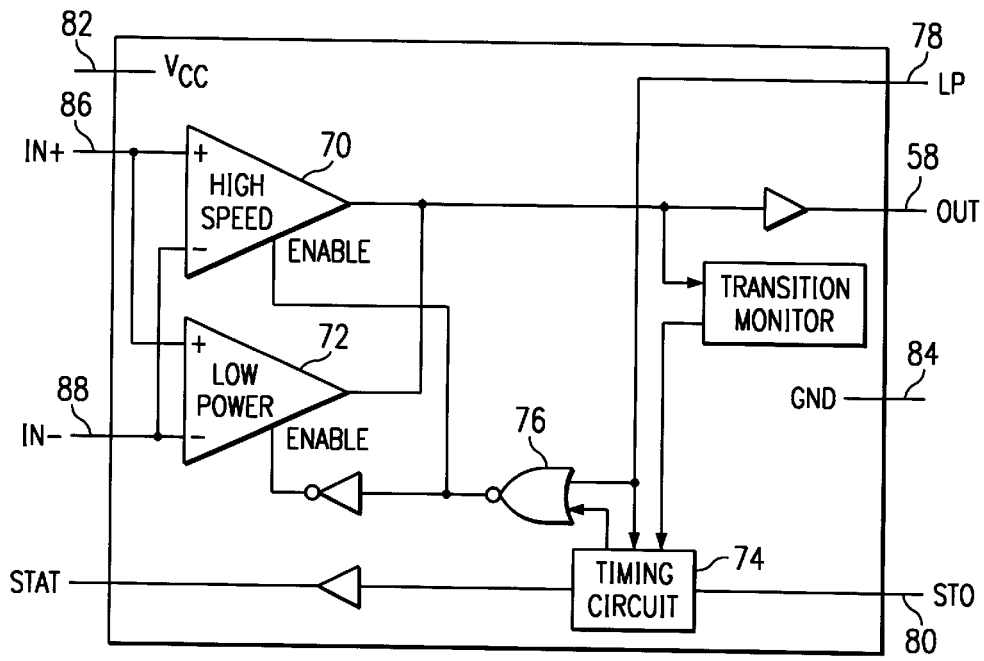
FIG. 3 is a block schematic diagram illustrating a dual speed comparator that may be modified for use in the present invention.

FIG. 3 illustrates an implementation of the comparator 52 in accordance with one embodiment of the present invention. In the embodiment, the comparator 52 is implemented by modifying a commercially available dual speed comparator to yield a sufficient propagation delay. In a particular embodiment, the dual speed comparator is a MAX975 operational amplifier configured as a comparator and manufactured by Maxim Integrated Products of Sunnyvale, Calif.

Referring to FIG. 3, the dual speed comparator incorporates a standby mode of operation. The device incorporates two internal operational amplifiers (op-amps) 70 and 72 configured to function as individual comparators. The first op-amp 70 operates at a high speed, and the second op-amp 72 operates at low power and low speed. Each of the op-amps 70 and 72 are turned on and off via a timing circuit 74 through an OR Gate 76.

The dual speed comparator can be configured to function as follows: By holding the LP (Low Power) pin 78 at a high value, the high speed op-amp 70 is disabled and the low power, lower speed op-amp 72 is enabled. The STO pin 80 is tied to ground via a 0.1 uf capacitor (not expressly shown) to disable auto-standby mode. The VCC pin 82 and ground pin 84 are tied to the local power supply 40 (lithium coin cell). The IN+ pin 86 is connected directly to the tag antenna 32 at the output of tuner circuit 42. The IN− pin 88 is connected directly to the output of the threshold voltage generator 54 as well as bypassed with a 0.1 uf capacitor (not expressly shown) to ground to stabilize the signal and prevent switching noise. With the device configured this way, approximately 75% of the functional characteristics of the device are disabled and not utilized. This is done in order to take advantage of the internal operational amplifier 72 being produced in the same CMOS process as the high speed op-amp 70 and thus inheriting some of the same performance characteristics. Operational amplifier 72 can then be applied to the present invention as a comparator with a low propagation delay of 600 ns at 10 mv overdrive with a current draw of three microamps. As previously described, comparator 52 used as a demodulator in radio tag 30 should have a propagation delay of 900 nanoseconds, considerably less than the 12 microseconds available from a commercially available comparator.

In another embodiment, comparator 52 may be implemented in an application specific integrated circuit (ASIC). In this embodiment, the comparator 52 may have a conventional design but be fabricated using complimentary metal oxide semiconductor (CMOS) techniques at a sub 0.35 micron process, such as Hewlett-Packard's MOSES process. In this embodiment, comparator 52 has a typical propagation delay of 900 nanoseconds and a maximum propagation delay of one microsecond at less than 10 millivolts overdrive using two to three microamps of current from a local power supply 40 (lithium coin cell battery) over an extended temperature range with CMOS compatible outputs on a 0.35 micron process. Comparator 52 is implemented using a low power, sub-micron CMOS process to properly balance the tradeoffs between power consumption and performance that currently available comparators inadequately address.

An exemplary embodiment utilizes a comparator with a propagation delay of 900 nanoseconds and a power consumption between two and three microamps. Since threshold voltage generator 54 draws approximately 997 nanoamps and comparator 52 draws approximately three microamps, the total power consumption of demodulator 44 is less than four microamps which will yield an adequate shelf life and is less than the leakage current of local power source 40.

The threshold voltage generator 54 may be implemented as a voltage divider circuit. In this embodiment, the threshold voltage generator 54 has a first resistor 60, a second resistor 62 and a capacitor 66. A first resistor 60 is coupled to local power source 40. First resistor 60 should have a resistance high enough to minimize the leakage current flow while still providing sufficient leakage current to generate threshold voltage signal 56. If the resistance of first resistor 60 is too high, insufficient current will be available to generate threshold voltage signal 56. If the resistance of first resistor 60 is too low, excessive current will be drawn from local power source 40 and inadequate shelf life will result.

A second resistor 62 is placed in series with first resistor 60 and is connected to a ground 64. The resistance of second resistor 62 is chosen to generate the appropriate voltage for threshold voltage signal 56. By varying the resistance of second resistor 62, the sensitivity of demodulator 44 may be varied. An increase in the resistance of second resistor 62 results in lower sensitivity of demodulator 44.

Capacitor 66 is connected across second resistor 62 in order to provide a constant voltage on threshold voltage signal 56. Capacitor 66 insures that the sensitivity of comparator 52 is constant and does not fluctuate with any fluctuations in local power source 40.

In the exemplary embodiment, a three megaohm resistor is used as first resistor 60 and a 6.8 kiloohm resistor is used as second resistor 62. The total current drawn by threshold voltage generator 54 is I=E/R, where I is current in amps, E is energy in volts, and R is resistance in ohms. Utilizing a three volt local power source 40 and having a total resistance from the resistances of first resistor 60 and second resistor 62 of 3,006,800 ohms, the total current drawn by the threshold voltage generator 54 is 3V/3,006,800 ohms=997 nanoamps. Therefore, threshold voltage generator 54 draws less than 1 microamp from battery 44.

In this embodiment, the threshold voltage signal may be calculated as E(R2)/(R1+R2), which is 3V(6800 ohms)/(3,006,800 ohms), or 6.8 millivolts. Therefore, any received signal which exceeds 6.8 millivolts may be processed. The threshold voltage signal could also, for example, comprise a voltage that is less than 500 millivolts, 50 millivolts, or 10 millivolts.

Figure 4:
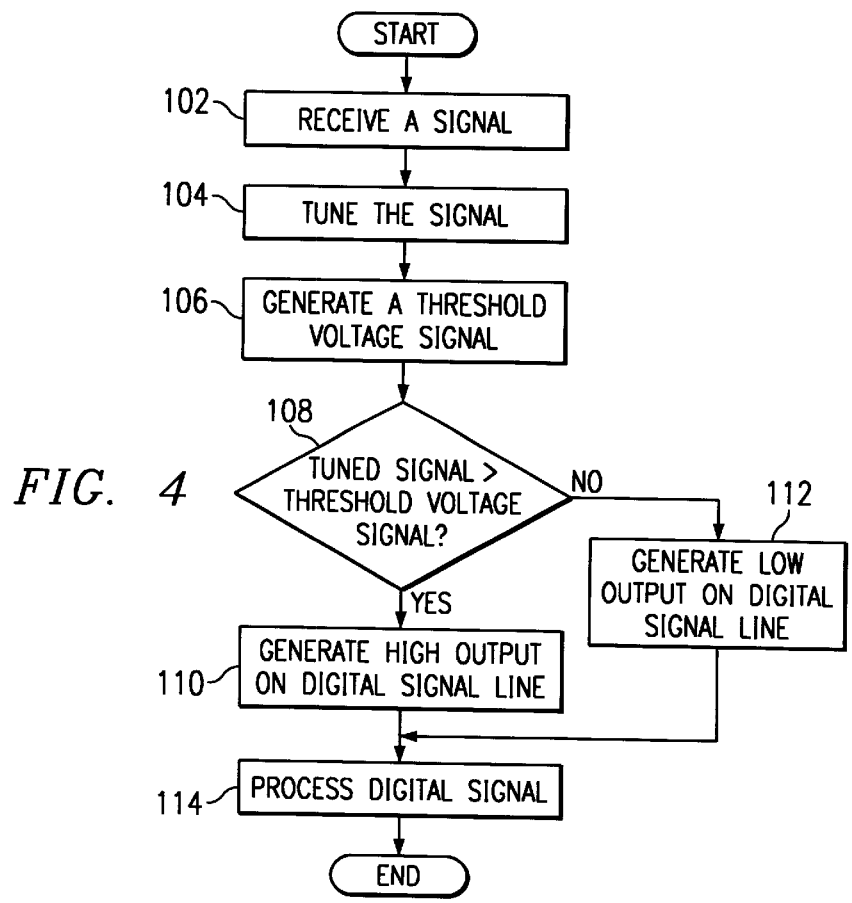
FIG. 4 is a flow diagram illustrating a method for receiving and demodulating a radio frequency signal in accordance with one embodiment of the present invention.

FIG. 4 illustrates a method for receiving and processing a radio frequency signal in the radio tag 30. Referring to FIG. 4, the method begins at step 102 where tag antenna 32 receives an analog signal which may contain either a modulated communicated signal from base unit 10 or general band noise occurring on the target frequency. At step 104, tuner circuit 42 filters and tunes analog signal 20. At step 106, threshold voltage generator 54 generates a threshold voltage signal 56 for use by comparator 52 in determining if the tuned signal represents incoming information. As previously described, the threshold voltage signal is constantly generated.

Next, at decisional step 108, comparator 52 compares the tuned signal to the threshold voltage signal. If the tuned signal does not exceed the threshold voltage signal, the NO branch of decisional step 108 leads to step 112 where comparator 52 generates a low output 58.

Returning to decisional step 108, if the tuned signal exceeds the threshold voltage signal, the YES branch of decisional step 108 leads to step 110 where comparator 52 generates a high output 58. Steps 110 and 112 lead to step 114 where the tag processor 38 processes the digital signals. Recall that tag processor 38 may need to accumulate several samples before determining if a bit is on or off.

It is apparent that there has been provided in accordance with the present invention a high sensitivity demodulator for a radio tag and method which satisfies the advantages set forth above such as operation on leakage current from a local power source, significantly higher sensitivity, and significantly increased operational range. Although the present invention and its advantages have been described in detail, it should be understood that various changes, substitutions, and alterations readily apparent to those skilled in the art may be made without departing from the spirit and the scope of the present invention as defined by the following claims.

What is claimed is:

1. A radio frequency tag, comprising:
   a threshold voltage generator coupled to a local power supply and operable to generate a threshold voltage signal of less than 500 millivolts on a threshold voltage generator output; and
   a low propagation delay comparator having a first comparator input coupled to an antenna to accept a received signal and a second comparator input coupled to the threshold voltage generator output to receive the threshold voltage signal, the comparator powered by the local power supply and operable to demodulate the received signal based on a comparison of the received signal to the threshold voltage signal.

2. A radio frequency tag, comprising:
   a threshold voltage generator coupled to a local power supply and operable to generate a threshold voltage signal on a threshold voltage generator output;
   a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
   wherein the comparator and the threshold voltage generator are powered by only leakage current from the local power supply.

3. The radio frequency tag of claim 1, wherein the comparator and the threshold voltage generator are powered by less than four microamps of current from the local power supply.

4. A radio frequency tag, comprising:
   a threshold voltage generator coupled to a local power supply and operable to generate a threshold voltage signal on a threshold voltage generator output;
   a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
   wherein a power consumption of the comparator is approximately three microamps.

5. A radio frequency tag, comprising:
   a threshold voltage generator coupled to a local power supply and operable to generate a threshold voltage signal on a threshold voltage generator output;
   a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
   wherein a power consumption of the threshold voltage generator is less than 1 microamp of current from the local power supply.

6. The radio frequency tag of claim 1, wherein the local power supply is a battery power supply.

7. The radio frequency tag of claim 1, wherein the local power supply is a lithium coin cell battery.

8. The radio frequency tag of claim 1, wherein the radio tag receives communicated signals on a very low frequency (VLF) carrier signal.

9. The radio frequency tag of claim 1, wherein the radio tag receives communicated signals on a low frequency (LF) carrier signal.

10. A radio frequency tag, comprising:
    a threshold voltage generator coupled to a local power supply and operable to generate a threshold voltage signal on a threshold voltage generator output;
    a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
    wherein the comparator has a propagation delay of less than fifteen percent of a period of a carrier signal on which communicated signals are received such that at least seven digital outputs are generated for each period.

11. A radio frequency tag, comprising:
    a threshold voltage generator coupled to a local power supply and operable to generate a threshold voltage signal on a threshold voltage generator output;
    a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
    wherein the comparator has a propagation delay of approximately ten percent of a period of a carrier signal on which communicated signals are received such that at least ten digital outputs are generated for the received signal during each period.

12. A radio frequency tag, comprising:
a threshold voltage generator coupled to a local power supply and operable to generate a threshold voltage signal on a threshold voltage generator output;
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
wherein the comparator has a propagation delay of less than one microsecond.

13. A radio frequency tag, comprising:
a threshold voltage generator coupled to a local power supply and operable to generate a threshold voltage signal on a threshold voltage generator output, the threshold voltage generator comprising;
  a first resistor coupled to the local power supply,
  a second resistor coupled in series to the first resistor, the second Testator further coupled to a ground; and
  the threshold voltage generator output coupled to a connection between the first resistor and the second resistor; and
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison.

14. The radio frequency tag of claim 13, further comprising:
a capacitor coupled to the connection between the first resistor and the second resistor, the capacitor further coupled to the ground, the capacitor operable to maintain a substantially constant voltage on the threshold voltage generator output.

15. A radio frequency tag, comprising:
a threshold voltage generator coupled to a local power supply and operable to generate a threshold voltage signal of less than 50 millivolts on a threshold voltage generator output; and
a comparator having a first comparator input coupled to an antenna to accept a received signal and a second comparator input coupled to the threshold voltage generator output to receive the threshold voltage signal, the comparator powered by the local power supply and operable to demodulate the received signal based on a comparison of the received signal to the threshold voltage signal.

16. A radio frequency tag, comprising:
a threshold voltage generator coupled to a local power supply and operable to generate a threshold voltage signal on a threshold voltage generator output;
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
wherein the radio frequency tag has a range in excess of ton feet.

17. A radio frequency tag, comprising:
a threshold voltage generator coupled to a local power supply and operable to generate a threshold voltage signal on a threshold voltage generator output;
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
wherein the radio frequency tag has a range in excess of 25 feet.

18. A radio frequency tag, comprising:
a threshold voltage generator coupled to a local power supply and operable to generate a threshold voltage signal on a threshold voltage generator output;
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
wherein the radio frequency tag has a range in excess of 100 feet.

19. A radio frequency tag, comprising:
a threshold voltage generator coupled to a local power supply and operable to generate a threshold voltage signal on a threshold voltage generator output;
a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison; and
wherein the radio frequency tag has a range in excess of 150 feet.

20. A method for demodulatig a signal at a radio frequency tag, comprising:
accepting a received signal;
generating a threshold voltage signal less than 500 millivolts;
comparing the received signal with the threshold voltage signal using a low propagation delay comparator; and
generating a digital output based on the comparison of the received signal to the threshold voltage signal.

21. A method for demodulating a signal at a radio frequency tag, comprising:
accepting a received signal;
generating a threshold voltage signal less than 10 millivolts;
comparing the received signal with the threshold voltage signal; and
generating a digital output based on the comparison of the received signal to the threshold voltage signal.

22. A method for demodulating a signal at a radio frequency tag, comprising:

accepting a received signal;

generating a threshold voltage signal less than 50 millivolts;

comparing the received signal with the threshold voltage signal;

generating a digital output based on the comparison of the received signal to the threshold voltage signal; and wherein generating the threshold voltage signal and comparing it to the received signal uses only leakage current from a local power supply.

23. The method of claim 20, further comprising generating the threshold voltage signal and comparing it to the received signal using less than four microamps of current from a local power supply.

24. A radio frequency tag, comprising:

a threshold voltage generator coupled to a local power supply and operable to generate a threshold voltage signal of less than 300 millivolts on a threshold voltage generator output; and a comparator having a first comparator input coupled to an antenna to accept a received signal and a second comparator input coupled to the threshold voltage generator output to receive the threshold voltage signal, the comparator powered by the local power supply and operable to demodulate the received signal based on a comparison of the received signal to the threshold voltage signal.

25. A method for demodulating a signal at a radio frequency tag, comprising:

accepting a received signal;

generating a threshold voltage signal less than 300 millivolts;

comparing the received signal with the threshold voltage signal; and generating a digital output based on the comparison of the received signal to the threshold voltage signal.

26. A method for demodulating a signal at a radio frequency tag, comprising:

accepting a received signal;

generating a threshold voltage signal less than 50 millivolts;

comparing the received signal with the threshold voltage signal; and generating a digital output based on the comparison of the received signal to the threshold voltage signal.

27. The method of claim 20, further comprising generating the threshold voltage signal and comparing it to the received signal using only leakage current from a local power supply.

* * * * *